Aug. 25, 1942.    F. D. BRADDON    2,293,707
GYROSCOPIC INSTRUMENT
Original Filed April 26, 1940    2 Sheets-Sheet 1

INVENTOR.
FREDERICK D. BRADDON
BY
Herbert H. Thompson
HIS ATTORNEY

Aug. 25, 1942. F. D. BRADDON 2,293,707
GYROSCOPIC INSTRUMENT
Original Filed April 26, 1940 2 Sheets-Sheet 2

INVENTOR.
FREDERICK D. BRADDON
BY
Herbert H. Thompson
HIS ATTORNEY.

Patented Aug. 25, 1942

2,293,707

UNITED STATES PATENT OFFICE 2,293,707

GYROSCOPIC INSTRUMENT

Frederick D. Braddon, Babylon, N. Y., assignor to Sperry Gyroscope Company, Inc., Brooklyn, N. Y., a corporation of New York Original application April 26, 1940, Serial No. 331,760, now Patent No. 2,257,730, dated October 7, 1941. Divided and this application May 22, 1941, Serial No. 394,627

4 Claims. (Cl. 33—204)

This invention relates to gyroscopic instruments such as air borne gyro compasses and more particularly is a division based on a part of the novel subject matter contained in the disclosure in United States Letters Patent No. 2,257,730, issued October 7, 1941, for an improvement in air borne gyro compasses.

The specific features of improvement, herewith disclosed, are particularly embodied in the structural provisions by which a gyroscopic instrument of the type such as described and shown in the above-identified pending application is protected from the influence of undesirable torques caused by the spoiled portions of the differential air jets.

Other features and structural details of the invention will be apparent from the following description when read in connection with the accompanying drawings, wherein.

Figure 1:
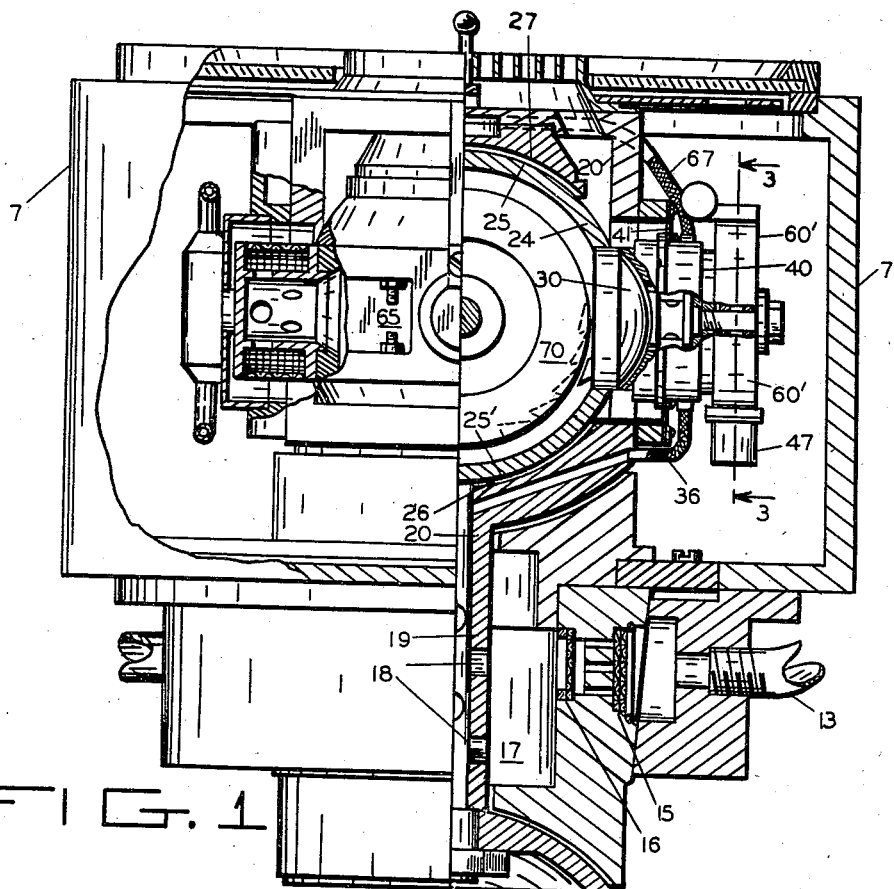
Fig. 1 is a detail view of the compass housing of the improved gyro instrument, part of this portion of the instrument being shown in side elevation and another part in vertical section.
Figure 3:
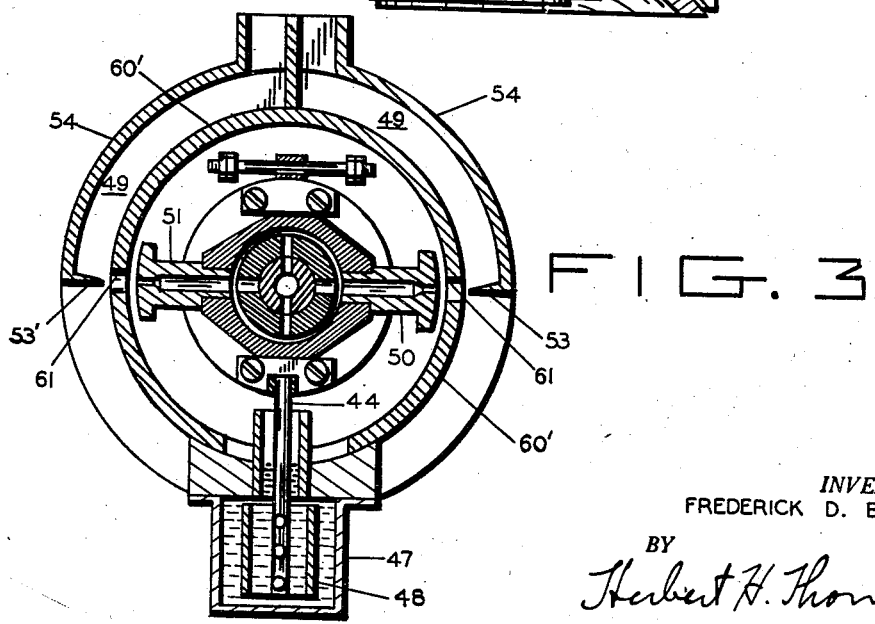
Fig. 3 is a section view taken on line 3—3, in Fig. 1.
Figure 2:
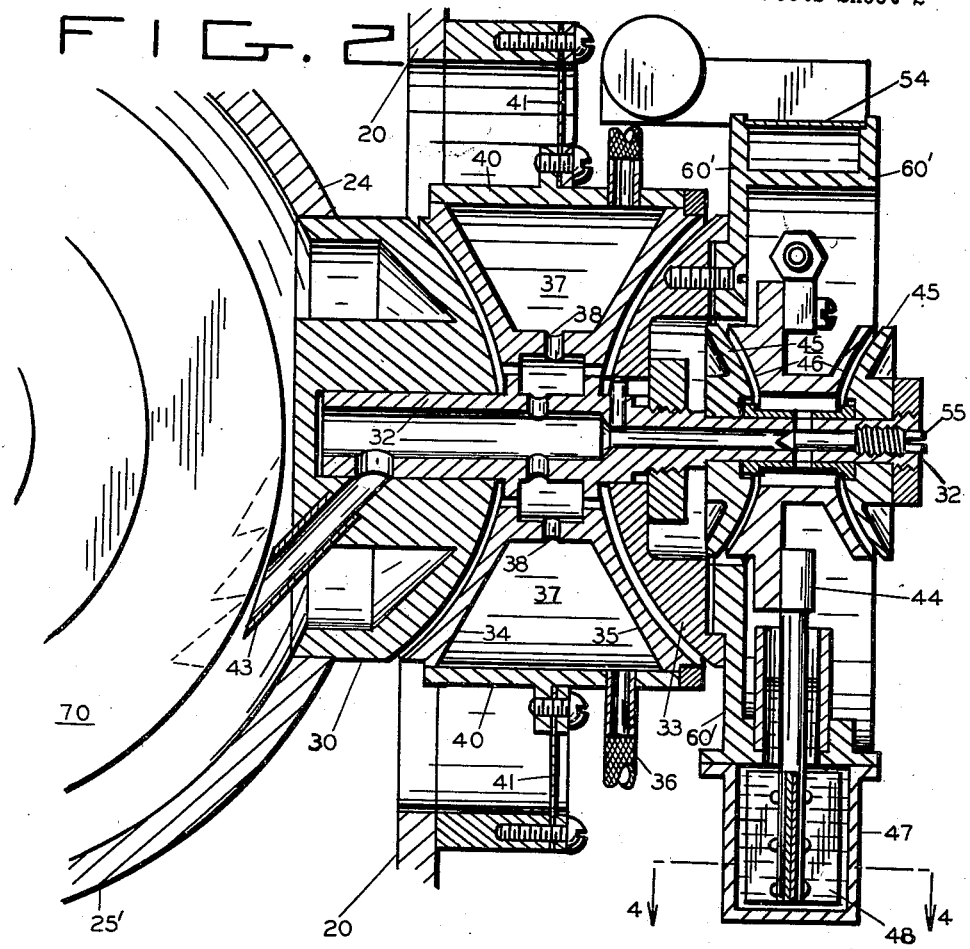
Fig. 2 is an enlarged vertical section taken of a portion of the instrument and particularly shows the improved provisions by which the instrument is damped.

With reference to Figs. 1 and 3 of the drawings, the compass housing of the improved gyroscopic instrument is indicated at 7. Air is supplied for the air bearings of the improved instrument and in this instance also the rotor element, from a pump (not shown), the air entering the compass housing 7 by way of pipe 13. In the lower extension of the housing 7 to which the pipe 13 is joined, the air passes through filters 15 and 16 into a chamber 17. A portion of the air then passes through apertures 18 in the central vertical stem 19 which extends downwardly from the vertical ring 20 of the compass and is distributed to the respective air bearings by which said ring is mounted to turn about a vertical axis.

The rotor casing 24 is preferably made up of three parts, one being an equatorial channeled ring 65 which carries the rotor bearings and the sides of which closely approach the sides of the rotor to reduce windage losses. Above and below the ring 65, a pair of large hollow concentric spherical buttons 25 and 25' are secured, the buttons fitting in complementary spherical concavities 26 and 27 in vertical ring 20 giving the casing three degrees of freedom.

In order to suppress angular movement of the casing about all axes except the horizontal E—W axis, I have shown the same as provided with a spherical button 30 at one side only, from which projects a hollow stem 32. On said stem is secured an oppositely facing button 33, the respective buttons forming portions of each of two oppositely facing concave air bearings 34 and 35 supported by the vertical ring 20, thereby preventing movement of the rotor casing except about the common diameter thereof. Air is supplied to the complementary portions of said bearings from flexible tubing connection 36 which is connected by a suitable passageway to the interior portion of stem 19. This connection leads air into the chamber 37 between the cups. The air in chamber 37 passes through ports 38 to move outwardly between the complementary button and cup surfaces. The chamber 37 is enclosed by a ring 40 which supports both cup members and is connected to the vertical ring 20 by means of a flexible diaphragm 41. The cups are thus given universal self-aligning support in the vertical ring. Air for spinning the rotor 70 also passes from the chamber 37 into the interior of the stem 32 by way of suitable ports therein, the air passing outwardly from the interior of the stem through one or more driving nozzles 43 to obtain this result. Air is also supplied to the upper spherical bearing 27 of the vertical ring from chamber 37 by way of flexible tubing 67.

For damping the compass I employ an improved type of controlling means which is preferably mounted on the hollow stem 32. For this purpose, I use opposite reactive air jets discharged from an air bearing supported, hollow, damped, pendulum which may be mounted on the stem 32 or pivot means by the complementary button and cup bearings 45 and 46 similar in construction, but smaller than the hereinafter described bearings associated with said pivot means. Means are provided under the control of a pendulum 44 for differentially spoiling the reaction from said jets upon relative inclination of the gyroscope and pendulum to thereby exert an unbalanced torque about the vertical axis in the proper direction to reduce the tilt. The pendulum 44 is shown as depending from the cup structure 46, while the oppositely facing cooperating buttons 45 are secured to the pivot means or stem 32. The lower portion of the pendulum 44 preferably dips into a container 47 containing oil or other fluid. Container 47 is mounted to tilt with the gyro casing 24, being shown as secured to the lower part of the circular framework 60', which in turn is suitably connected to the back of the button 33 mounted on pivot means 32. To damp the pendulum itself, blades or paddles 48 are secured to the portion of the pendulum extending within the container 47.

Figure 4:
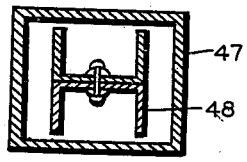
Fig. 4 is a sectional view taken on line 4—4, in Fig. 2.

As shown in Fig. 4, the lower portion of the fluid containing member 47 is rectangular in cross-section, the same forming a chamber of relatively large size in comparison with the upper or entrance defining chamber associated with the same. The spaced, radially located, blades or paddles 48 on the pendulum 44 move within the respective closed end portions of the lower chamber 47 in a manner similar to the motion of a piston within a cylinder. The level of the fluid situated within the two part container is located in the upper or relatively small entrance defining chamber as clearly shown in the drawings.

With reference to Fig. 3, also mounted on the cup member 46 from which the pendulum decup member are oppositely disposed, radially directed, tubes or channel members 50 and 51, from the ported ends or orifices of which air jets are normally discharged horizontally in opposite directions. The jets are normally bisected by baffles or spoiler members 53 and 53', which are shown as formed by bending inwardly knife edges on segmental covering 54 for channels 49 formed by the circular framework 60' which is secured to button 33 attached to the pivot means or stem 32 of the instrument. The circular enclosure forming framework 60' has a pair of apertures 61 normally in line with but of a greater diameter than the ports at the respective ends of the tubes 50 and 51 which permits limited tilt of the tubes with respect to framework. Enclosure 60' thus acts as a shielding member by means of which the spoiled portion of the air jets is prevented from influencing movement of the pendulum. That portion of the air jets which is not engaged by the knife edges 53 and 53' exerts a reactive torque on the gyroscope about its vertical axis. Also the respective portions of the air jets which are engaged or spoiled by the knife edges are deflected up the defined channels 49 and exhaust from the top of the framework 60' in a vertical direction so as to exert no torque on the instrument. Hence any relative tilt of the pendulum and gyroscope causes unbalanced torque about the vertical axis to reduce the tilt and damp the compass. The damping rate may be effectively varied by an adjustable throttle valve 55 situated at the end of the longitudinally hollow pivot means or stem 32.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyroscopic instrument, the combination of a gyro casing, a normally horizontal pivot means therefor at one side of the casing, means whereby air is admitted to the gyro casing through said pivot means, damping means having a pendulous member pivoted on said pivot means and containing oppositely disposed orifices radially directed with relation to the pivot means, which orifices are supplied with a portion of the air supplied to the pivot means, and spoiling members, mounted on the respective ends of a channel defining structure situated on the gyro casing adjacent said pivot means, against which the air jets from said orifices are differentially directed, said channel defining structure diverting the spoiled portions of said jets and exhausting the same so that no torque is exerted thereby on the instrument.

2. In a gyroscopic instrument, the combination of a gyro casing, a normally horizontal pivot means therefor at one side of the casing, means whereby air is admitted to the gyro casing through said pivot means, damping means having a pendulous member pivoted on said pivot means and containing oppositely disposed orifices radially directed with relation to the pivot means, which orifices are supplied with a portion of the air supplied to the pivot means, spoiling members, mounted on the respective ends of a channel defining structure situated on the gyro casing adjacent said pivot means, against which the air jets from said orifices are differentially directed, said channel defining structure diverting the spoiled portions of said jets and exhausting the same so that no torque is exerted thereby on the instrument, and an apertured shield disposed between the orifices and spoiling members whereby deflecting torque due to stray air currents in the channel defining structure are prevented.

3. A gyroscopic instrument having a pendulous damping device including a hollow pendulum, means for leading air into the same through its pivot support, said pendulum having oppositely directed ports from which the air from the leading means exhausts in jets which normally exert equal and opposite torques about one of the axes of the gyroscopic instrument, baffle means on the instrument normally intercepting equal portions of the jets whereby, upon relative tilt of said pendulum and instrument, an unbalanced reactive torque proportional to the tilt is exerted thereon, and guide channels associated with said baffle means for diverting the intercepted portions of the jets and exhausting the same in such a manner as to exert no torque on the instrument.

4. A gyroscopic instrument having a pendulous damping device including a hollow pendulum, means for leading air into the same through its pivot support, said pendulum having oppositely directed ports from which the air from the leading means exhausts in jets which normally exert equal and opposite torques about one of the axes of the gyroscopic instrument, baffle means on the instrument normally intercepting equal portions of the jets whereby, upon relative tilt of said pendulum and instrument, an unbalanced reactive torque proportional to the tilt is exerted thereon, guide channels associated with said baffle means for diverting the intercepted portions of the jets and exhausting the same in such a manner as to exert no torque on the instrument, and an apertured shield for the instrument situated between the ports and baffle means whereby deflecting torques due to stray air currents in the guide channels are prevented.

FREDERICK D. BRADDON.